United States Patent
Takahashi et al.

(10) Patent No.: US 8,356,949 B2
(45) Date of Patent: Jan. 22, 2013

(54) FOCAL PLANE SHUTTER AND OPTICAL DEVICE

(75) Inventors: Hiroshi Takahashi, Chiba (JP); Seiichi Oishi, Chiba (JP)

(73) Assignee: Seiko Precision Inc., Narashino-shi (JP)

( * ) Notice: Subject to any disclaimer, the term of this patent is extended or adjusted under 35 U.S.C. 154(b) by 0 days.

(21) Appl. No.: 13/235,875

(22) Filed: Sep. 19, 2011

(65) Prior Publication Data

US 2012/0008933 A1  Jan. 12, 2012

Related U.S. Application Data

(63) Continuation of application No. PCT/JP2011/050134, filed on Jan. 6, 2011.

(30) Foreign Application Priority Data

Feb. 22, 2010  (JP) .................................. 2010-035703

(51) Int. Cl.
*G03B 9/32* (2006.01)
(52) U.S. Cl. ....................................... 396/480; 396/456
(58) Field of Classification Search .................. 396/452, 396/456, 480
See application file for complete search history.

(56) References Cited

U.S. PATENT DOCUMENTS

| | | | | |
|---|---|---|---|---|
| 5,392,085 A | * | 2/1995 | Tanabe | 396/490 |
| 5,420,654 A | * | 5/1995 | Tanabe et al. | 396/493 |
| 5,508,773 A | * | 4/1996 | Miyazaki et al. | 396/486 |
| 6,106,165 A | * | 8/2000 | Tanabe | 396/471 |
| 6,726,379 B2 | * | 4/2004 | Watabe et al. | 396/456 |
| 2002/0114628 A1 | * | 8/2002 | Nakano et al. | 396/484 |
| 2011/0026914 A1 | * | 2/2011 | Arai | 396/483 |

FOREIGN PATENT DOCUMENTS

| | | |
|---|---|---|
| JP | 8-334808 | 12/1996 |
| JP | 9-24432 | 1/1997 |
| JP | 2005-107172 A1 | 4/2005 |
| JP | 2006-189467 A1 | 7/2006 |
| JP | 2009-175365 A1 | 8/2009 |

OTHER PUBLICATIONS

International Search Report for International Application No. PCT/JP2011/050134 dated Jan. 25, 2011.

\* cited by examiner

*Primary Examiner* — Clayton E Laballe
*Assistant Examiner* — Warren Fenwick
(74) *Attorney, Agent, or Firm* — Kratz, Quintos & Hanson, LLP (57) ABSTRACT

A focal plane shutter includes: a board including an opening; a blade movable between a position where the blade recedes from the opening and a position where the blade covers at least part of the opening; a drive arm connected to the blade, the drive arm including an engagement hole; a drive lever including a drive pin engaging the engagement hole; and a restriction portion provided in the drive arm, the restriction portion abutting the drive pin and being thicker than the drive arm.

5 Claims, 8 Drawing Sheets

FIG. 8

FOCAL PLANE SHUTTER AND OPTICAL DEVICE

CROSS-REFERENCE TO RELATED APPLICATION

This application is a continuation of and claims priority to International Patent Application No. PCT/JP2011/050134 filed on Jan. 6, 2011, which claims priority to Japanese Patent Application No. 2010-035703 filed on Feb. 22, 2010, subject matter of these patent documents is incorporated by reference herein in its entirety.

BACKGROUND (i) Technical Field

The present invention relates to focal plane shutters and optical device.

(ii) Related Art

Japanese Unexamined Patent Application Publication No. 8-334808 discloses a focal plane shutter. In the focal plane shutter, a drive pin provided in a drive lever engages a drive arm connected to a blade, thereby driving the blade.

The drive arm and the drive pin are engaged with each other, causing at least one of them to be chipped. This might generate dusts. Such dusts might influence on image quality.

SUMMARY

It is therefore an object of the present invention to provide a focal plane shutter and an optical device that prevent dusts from generating.

According to an aspect of the present invention, there is provided a focal plane shutter including: a board including an opening; a blade movable between a position where the blade recedes from the opening and a position where the blade covers at least part of the opening; a drive arm connected to the blade, the drive arm including an engagement hole; a drive lever including a drive pin engaging the engagement hole; and a restriction portion provided in the drive arm, the restriction portion abutting the drive pin and being thicker than the drive arm, wherein the engagement hole includes a first edge positioned at a start side where the drive pin moves in a predetermined direction and a second edge positioned at a terminal side where the drive pin moves in the predetermined direction, and the restriction portion allows an abutment of the second edge with the drive pin, and abuts the drive pin to restrict an abutment of the first edge with the drive pin.

DETAILED DESCRIPTION

Figure 1:
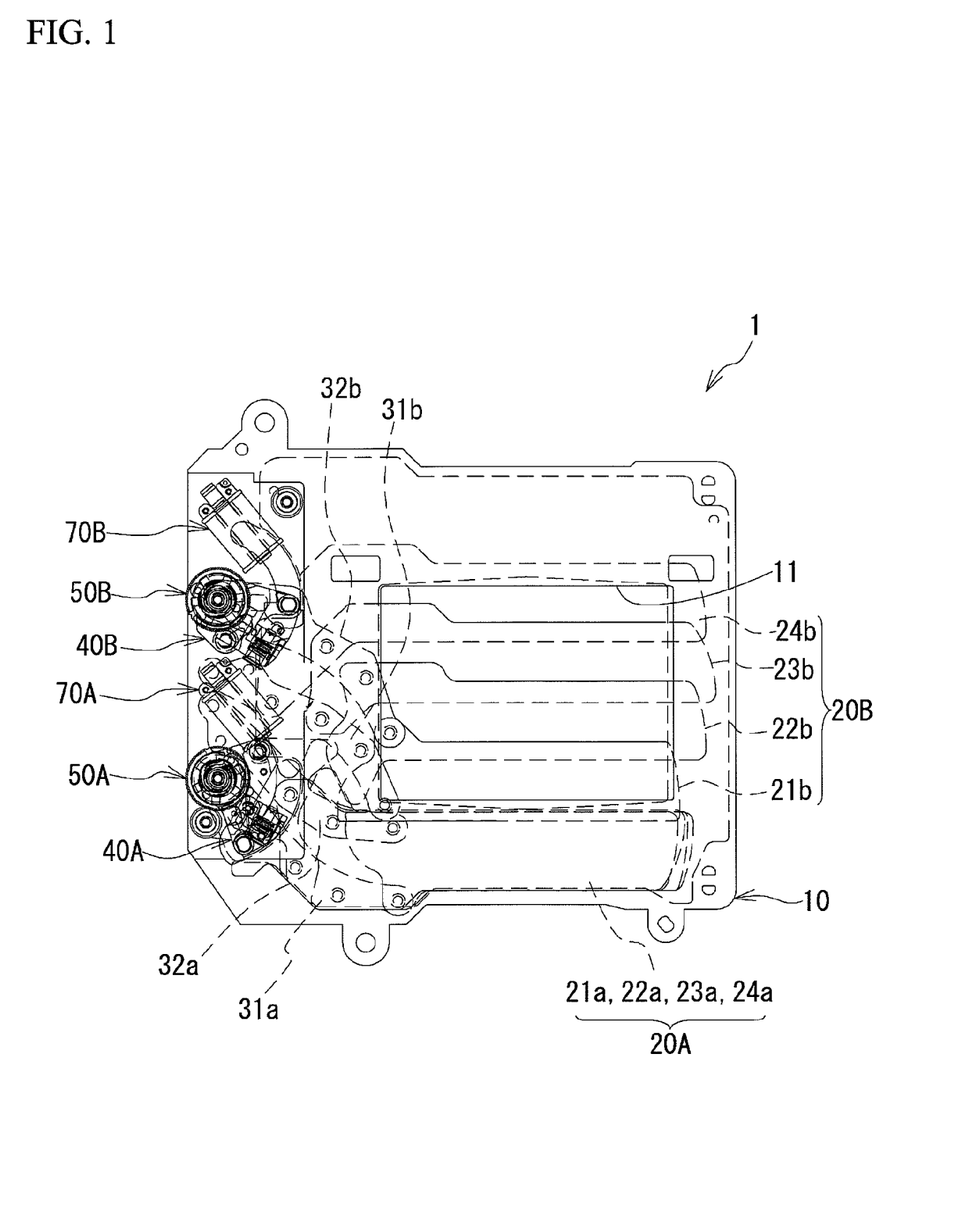
FIG. 1 is front view of a focal plane shutter according to the present embodiment.

An embodiment will be described with reference to the drawings as follows. In the present embodiment, a focal plane shutter will be described as an example of a blade drive device. FIG. 1 is front view of a focal plane shutter according to the present embodiment. As illustrated in FIG. 1, the focal plane shutter 1 includes: a board 10; blades 21a to 24a and 21b to 24b; drive arms 31a, 32a, 31b and 32b; and electromagnets 70A and 70B. The board 10 is made of a synthetic resin, and includes an opening 11 with a rectangular shape. Each of the blades 21a to 24a and 21b to 24b is made of a synthetic resin and is thinly formed. Also, each of the drive arms 31a, 32a, 31b and 32b is made of a metal sheet to retain its strength. Each of the blades 21a to 24a and 21b to 24b move between a position of receding from the opening 11 and a position of covering at least part of the opening 11.

Four blades 21a to 24a configure leading blades 20A. Four blades 21b to 24b configure trailing blades 20B. FIG. 1 illustrates the leading blades 20A in an overlapped state and the trailing blades 20B in a expanded state. In FIG. 1, the leading blades 20A recedes from the opening 11 and the trailing blades 20B close the opening 11.

The leading blades 20A are connected to the drive arms 31a and 32a. The trailing blades 20B are connected to the drive arms 31b and 32b. These drive arms 31a, 32a, 31b and 32b are swingably supported by the board 10.

A leading blades-drive lever 40A for driving the drive arm 31a and a trailing blades-drive lever 40B for driving the drive arm 32b are provided in the board 10. The leading blades-drive lever 40A and the trailing blades-drive lever 40B are supported by the board 10 to be swingable in a predetermined range. Specifically, the leading blades-drive lever 40A is supported to swing about a spindle provided in the board 10. The swinging range of the leading blades-drive lever 40A is limited by a rubber, mentioned later, provided at an end portion of a slot formed in the board 10. This is applicable to the trailing blades driving lever 40B. The leading blades-drive lever 40A and the trailing blades-drive lever 40B are each made of a synthetic resin.

The drive arm 31a is connected to the leading blades-drive lever 40A. The drive arm 32b is connected to the trailing blades-drive lever 40B. The swinging of the leading blades-drive lever 40A causes the drive arm 31a to swing, thereby moving the leading blades 20A. Likewise, the swinging of the trailing blades-drive lever 40B causes the drive arm 32b to swing, thereby moving the trailing blades 20B.

The leading blades-drive lever 40A and the trailing blades-drive lever 40B each holds an iron piece which does not have a reference numeral. The leading blades-drive lever 40A can swing between the position where the iron piece abuts the electromagnet 70A and the position where the iron piece recedes from the electromagnet 70A. This is applicable to the trailing blades-drive lever 40B.

Also, the leading blades-drive lever 40A is biased by a spring, not illustrated, in such a direction as to move away from the electromagnet 70A. Likewise, the trailing blades-drive lever 40B is biased by a spring, not illustrated, in such a direction as to move away from the electromagnet 70B.

Ratchet wheels 50A and 50B engage the leading blades-drive lever 40A and the trailing blades-drive lever 40B, respectively, through the springs mentioned above. One end of the spring, which biases the leading blades-drive lever 40A in such a direction as to move away from the electromagnet 70A, engages the ratchet wheel 50A. The other end of the spring engages the leading blades-drive lever 40A. The rotational amount of the ratchet wheel 50A is adjusted, thereby adjusting the biasing force of the spring. The ratchet wheel 508 also has a function similar to that of the ratchet wheel 50A.

The electromagnet 70A is energized, thereby adsorbing the iron piece of the leading blades-drive lever 40A. Likewise, the electromagnet 70B is energized, thereby adsorbing the iron piece of the trailing blades-drive lever 40B.

Figure 2:
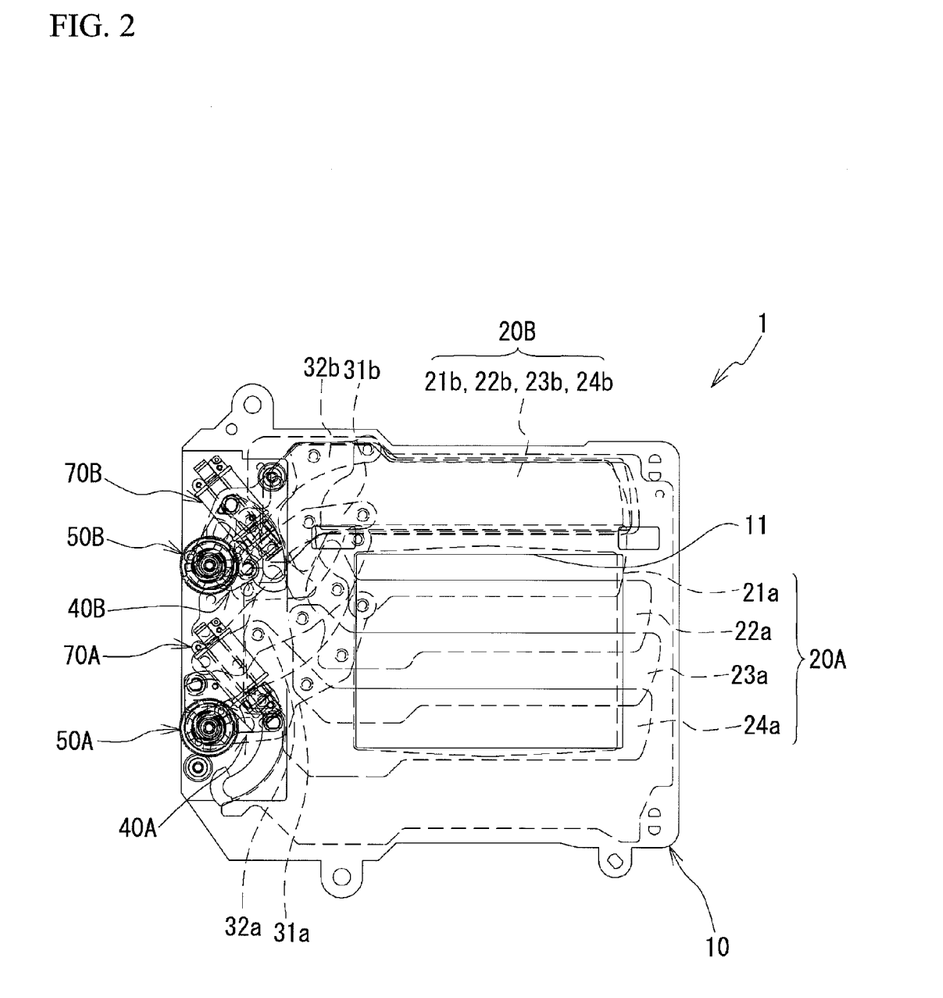
FIG. 2 is an explanatory view of an operation of the focal plane shutter.
Figure 3:
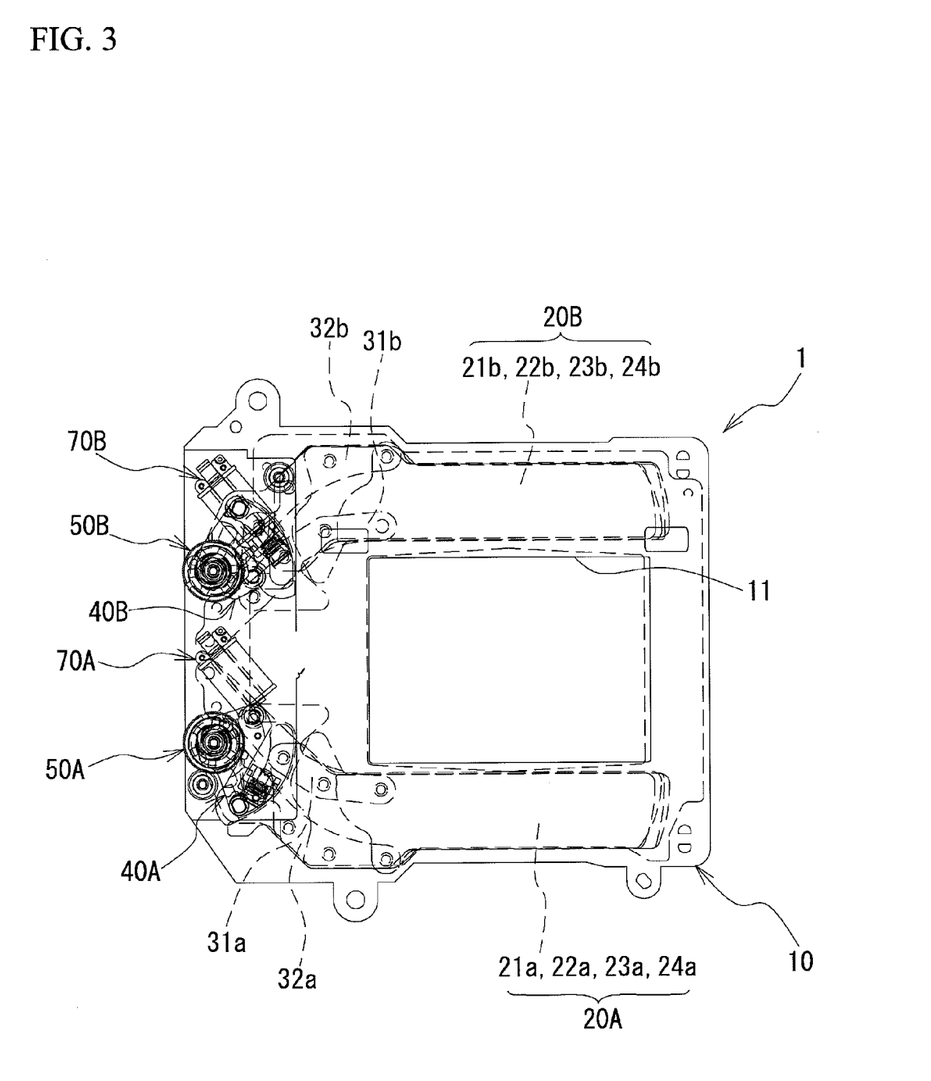
FIG. 3 is an explanatory view of the operation of the focal plane shutter.

Next, the operation of the focal plane shutter 1 will be described. FIGS. 1 to 3 are explanatory views of the operation of the focal plane shutter 1. Here, FIG. 2 illustrates the focal plane shutter 1 in an initial state. In this initial state, a set lever not illustrated is secured to an initial position, the leading blades 20A are expanded to close the opening 11, and the trailing blades 20B are overlapped each other to recede from the opening 11. In this initial state, the iron pieces of the leading blades-drive lever 40A and the trailing blades-drive lever 40B abut the electromagnets 70A and 70B respectively, and are set in such an initial position as to be adsorbed to them respectively.

In shooting, a release button of the camera is pushed to energize coils of the electromagnets 70A and 70B, whereby the iron piece of the leading blades-drive lever 40A is adsorbed to the electromagnet 70A and the iron piece of the trailing blades-drive lever 40B is adsorbed to the electromagnet 70B. After that, the set lever moves away from the leading blades-drive lever 40A and the trailing blades-drive lever 40B. At this time, the leading blades drive lever 40A and the trailing blades-drive lever 40B remain adsorbed to the electromagnets 70A and 70B, respectively.

Afterward, the energization of the coil of the electromagnet 70A is cut, thereby rotating the leading blades-drive lever 40A in a clockwise direction by the biasing force of the spring as illustrated in FIG. 3. Therefore, the leading blades 20A move away from the opening 11 to be in the overlapped state. Also, the energization of the coil of the electromagnet 70B remains for a predetermined period, whereas the trailing blades 20B remain away from the opening 11. This causes the opening 11 to be in an opened state. FIG. 3 illustrates an exposed state.

After a predetermined period lapses from a time when the release button is pushed, the energization of the coil of the electromagnet 70B is cut, and then the trailing blades-drive lever 40B rotates clockwise by the biasing force of the spring. Therefore, the trailing blades 20B are expanded to close the opening 11. The trailing blades-drive lever 40B abuts a rubber, as will be mentioned later, for preventing bound, provided at an end of the slot formed in the board 10. FIG. 1 illustrates the state just after the exposure operation is finished. In such a way, one cycle of shooting is finished.

Next, the leading blades-drive lever 40A and the trailing blades-drive lever 40B are rotated counterclockwise by a set lever not illustrated. Therefore, the leading blades 20A are expanded to close the opening 11 and the trailing blades 20B are overlapped each other to recede from the opening 11, whereby the state is returned to the initial state illustrated in FIG. 2.

Figure 4:
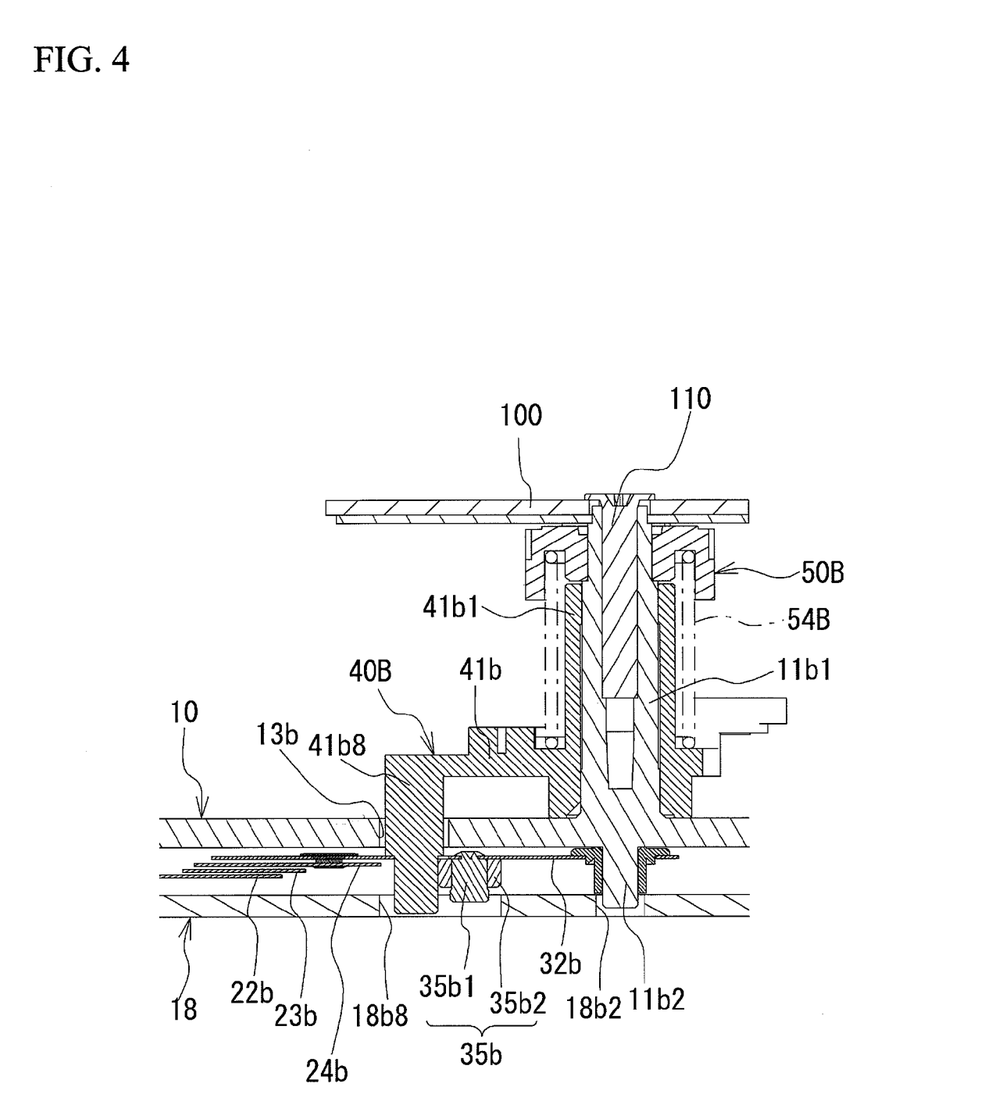
FIG. 4 is a sectional view of a structure around a trailing blades-drive lever.

Next, the structure around the drive lever will be described below. Although the leading blades-drive lever 40A and the trailing blades-drive lever 40B differ in shape from each other, they have substantially the same configuration and the same parts. The following description will be given of only the trailing blades-drive lever 40B. FIG. 4 is a sectional view of the structure around the trailing blades-drive lever 40B.

The trailing blades-drive lever 40B includes: a board-shaped base portion 41b, a cylindrical portion 41b1 and a drive pin 41b8 standing on the base portion 41b. Around the cylindrical portion 41b1, there are provided the ratchet wheel 50B and a spring 54B for giving the trailing blades-drive lever 40B a biasing force. One end of the spring 54B is secured to the trailing blades-drive lever 40B side, and the other end of the spring 54B is secured to the ratchet wheel 50B side. The rotational amount of the ratchet wheel 50B is adjusted, thereby adjusting the biasing force of the spring 54B. The spring 54B biases the trailing blades-drive lever 40B in such a direction as to move away from the electromagnet 70B.

A spindle 11b1 provided in the board 10 is fitted into the cylindrical portion 41b1. The trailing blades-drive lever 40B rotates about the spindle 11b1 in a predetermined range. An end of the spindle 11b1 is attached to a printed circuit board 100 by a pin 110. The printed circuit board 100 controls the energization of the electromagnets 70A and 70B.

The drive pin 41b8 extends downwardly from the base portion 41b. The drive pin 41b8 is fitted onto the drive arm 32b. Further, an escape hole 13b for escaping the drive pin 41b8 is formed in the board 10. A spindle 11b2 is coaxially formed with the spindle 11b1 in the board 10. The drive arm 32b rotatably fits onto the spindle 11b2. The drive arm 32b rotates about the spindle 11b2 in a predetermined range.

A back board 18 is arranged to face the board 10. The drive arm 32b, the trailing blades 20B, and the like are housed between the board 10 and the back board 18. As illustrated in FIG. 4, the drive arm 32b is provided with a restriction portion 35b. The restriction portion 35b is configured with a pin 35b1 and an elastic portion 35b2. They will be described later in detail. In the back board 18, there are provided an escape hole 18b8 for escaping the drive pin 41b8 and the restriction portion 35b, and an escape hole 18b2 for escaping the spindle 11b2.

Figure 5:
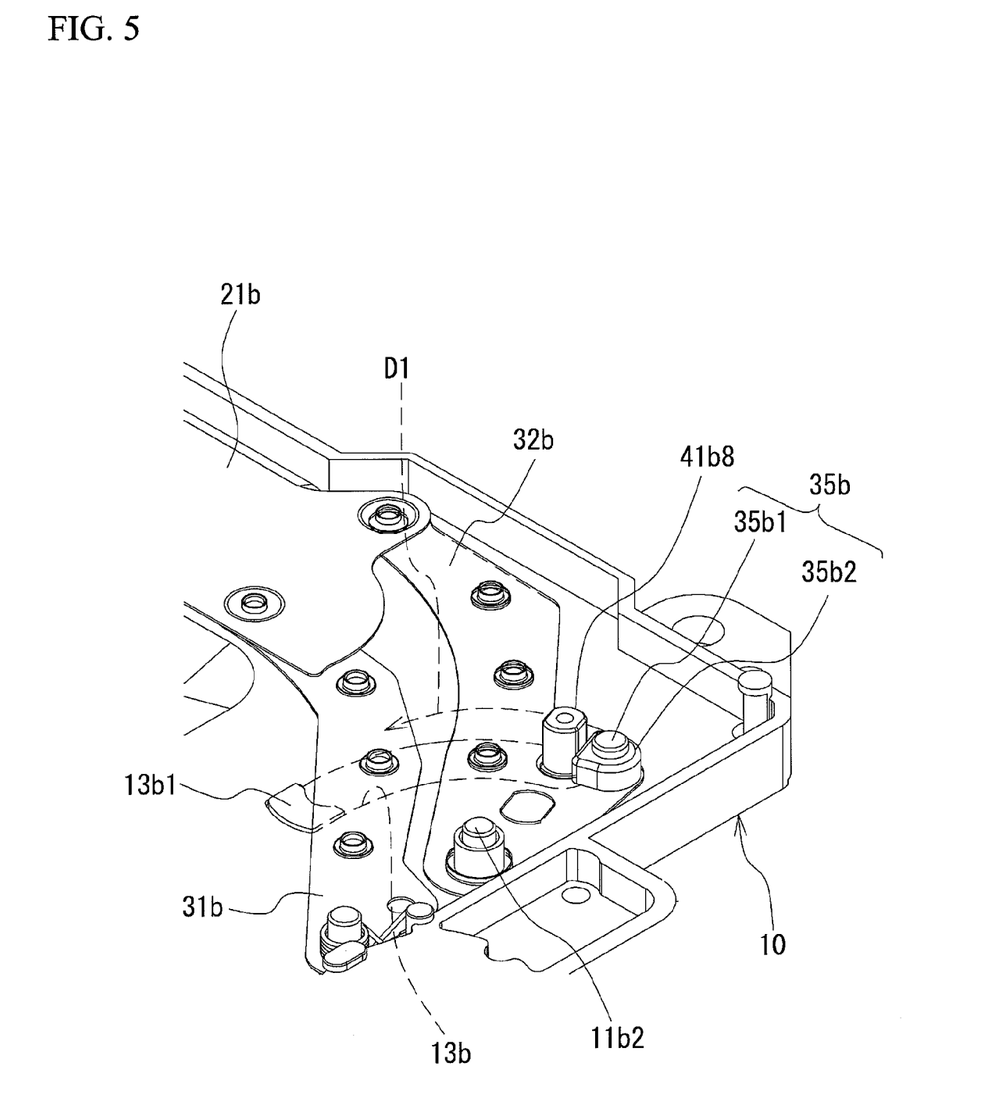
FIG. 5 is a perspective view of a structure around the drive pin.

FIG. 5 is a perspective view of the structure around the drive pin 41b8. FIG. 5 is a perspective view around the drive pin 41b8 in a state where the set operation illustrated in FIG. 2 is accomplished. Additionally, the blades except for the blade 21b are omitted in FIG. 5. As illustrated in FIG. 5, the escape hole 13b has an arc shape with a pivot serving as a rotation center of the trailing blades-drive lever 40B. The drive pin 41b8 moves within the escape hole 13b. A rubber 13b1 for preventing the bound of the drive pin 41b8 is secured at the end of the escape hole 13b.

After the set operation is accomplished, the energization of the electromagnet 70A is cut to drive the leading blades-drive lever 40A at first. Then, after a predetermined period, the energization of the electromagnet 70B is cut to drive the trailing blades-drive lever 40B. A movement direction D1 illustrated in FIG. 5 is one of movements of the drive pin 41b8 when the energization of the electromagnet 70B is cut to cause the trailing blades-drive lever 40B in the set state to be driven according to the biasing force of the spring 54B. Thus, the drive pin 41b8 moves in the movement direction D1 to abut the rubber 13b1 at the terminal end of the movable range, and then stops.

Additionally, when the state illustrated in

FIG. 1 is shifted to the state illustrated in FIG. 2, the drive pin 41b8 is moved in the opposite direction of the movement direction D1 by the set lever not illustrated. The speed of the drive pin 41b8 moved in the movement direction D1 by the biasing force of the spring is faster than that of the drive pin 41b8 moved in the opposite direction of the movement direction D1 by the set lever.

Figure 6:
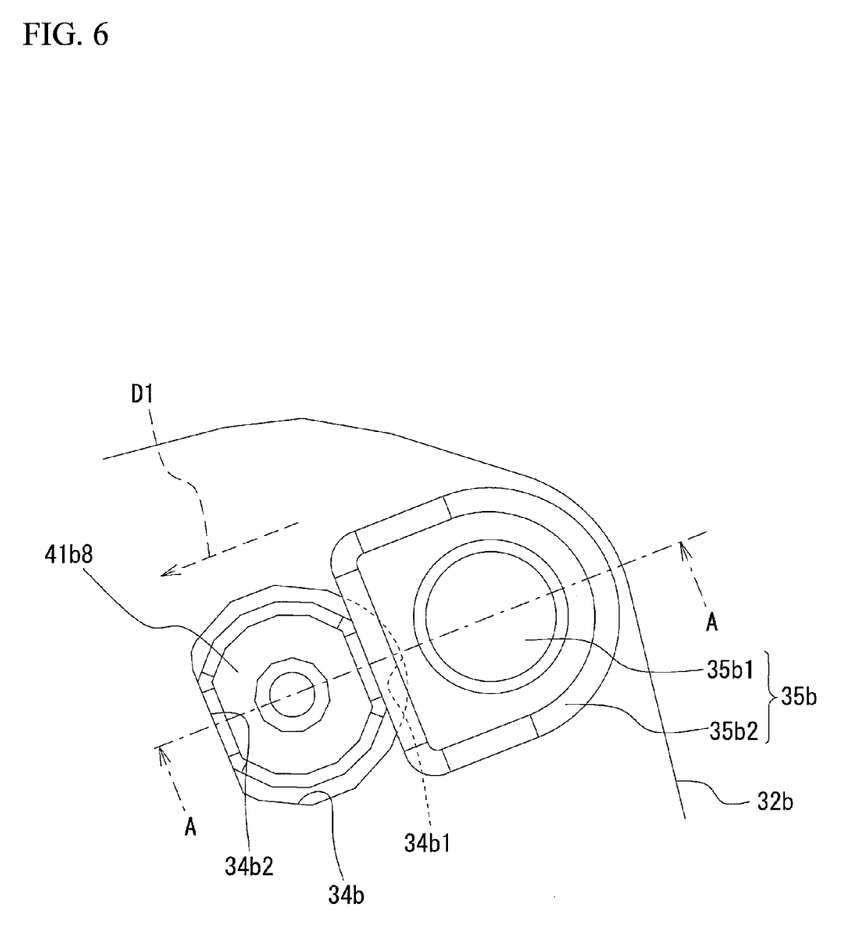
FIG. 6 is an explanatory view of a restriction portion.
Figure 7:
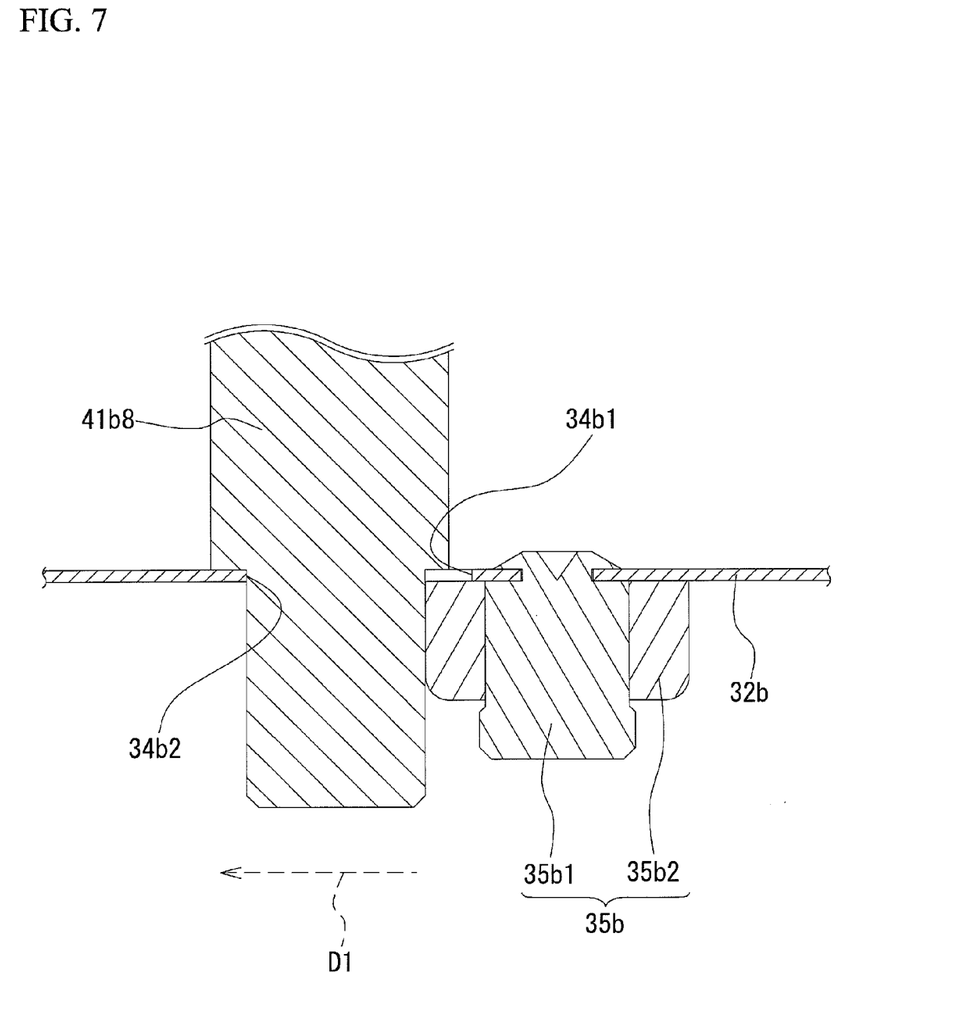
FIG. 7 is an explanatory view of the restriction portion.

Next, the restriction portion 35b will be described. FIGS. 6 and 7 are explanatory views of the restriction portion 35b. FIG. 6 is the view of the restriction portion 35b when viewed from its top, and FIG. 7 is the sectional view taken along line A-A. The drive arm 32b is formed with an engagement hole 34b into which the drive pin 41b8 fits. The pin 35b1 is secured to the drive arm 32b by caulking and is made of a synthetic resin. The pin 35b1 fits into the elastic portion 35b2. The elastic portion 35b2 has a ring shape, and is made of a rubber which is elastically deformable. The elastic portion 35b2 abuts the drive pin 41b8. The restriction portion 35b is thicker than the drive arm 32b.

The engagement hole 34b has a first edge 34b1 positioned at the start side of the movable range in the movement direction D1 and a second edge 34b2 positioned at the terminal side of the movable range in the movement direction D1. The first edge 34b1 and the second edge 34b2 face each other through the drive pin 41b8. The restriction portion 35b and the drive pin 41b8 are arranged in the movement direction D1 in this order.

The restriction portion 35b restricts the abutment of the drive pin 41b8 with the first edge 34b1. However, the abutment of the drive pin 41b8 with the second edge 34b2 is permitted. As illustrated in FIGS. 6 and 7, a predetermined clearance is formed between the drive pin 41b8 and the first edge 34b1. The restriction portion 35b abuts the drive pin 41b8 to remain such a state.

Next, a function of the restriction portion 35b will be described. When the trailing blades-drive lever 40B drives and the drive pin 41b8 moves in the movement direction D1, the drive pin 41b8 pushes the second edge 34b2 to drive the drive arm 32b. This drives the trailing blades 20B. When the trailing blades-drive lever 40B moves in a predetermined range, the drive pin 41b8 abuts the rubber 13b1 illustrated in FIG. 5, and then the drive lever 40B stops. When the drive pin 41b8 stops, the drive arm 32b intends to cause the drive pin 41b8 to abut the first edge 34b1 by a inertia force of the drive arm 32b and the like. However, the restriction portion 35b restricts the abutment of the drive pin 41b8 with the first edge 34b1. For this reason, even when the drive pin 41b8 stops in the movable state, the drive pin 41b8 does not abut the first edge 34b1.

If the restriction portion 35b is not provided, the drive pin 41b8 abuts the first edge 34b1 according to the inertial force of the drive arm 32b and the like at the time when the drive pin 41b8 stops in the movable state. Especially, when the trailing blades-drive lever 40B moves at a high speed or repeats reciprocation for a short period, at least one of the drive pin 41b8 and the first edge 34b1 might be chipped. This might generate dusts. When the dusts disperse and reach the opening 11 side, the image quality might be affected. However, in this embodiment, since the restriction portion 35b restricts the abutment of the drive pin 41b8 with the first edge 34b1, the above problem can be prevented.

Also, the elastic portion 35b2 is elastically deformed to absorb the inertia force of the drive arm 32b and the like, thereby reducing the load applied on the drive arm 32b at the time when the elastic portion 35b2 abuts the drive pin 41b8. This can prevent the damage of the drive arm 32b.

The restriction portion 35b restricts the abutment of the first edge 34b1 with the drive pin 41b8, but allows the abutment of the second edge 34b2 with the drive pin 41b8. If the second edge 34b2 surrounds the entire outer periphery of the drive pin 41b8 to restrict the abutment of the second edge 34b2 with the drive pin 41b8, the following problem might occur. The elastic portion 35b2 is elastically deformable as mentioned above. For this reason, if the drive pin 41b8 abuts the elastic portion 35b2 at the time when the drive pin 41b8 starts moving in the movement direction D1, the elastic portion 35b2 is elastically deformed and the timing when the drive arm 32b starts moving might be delayed from the timing when the drive pin 41b8 starts moving. For this reason, the timing when the trailing blades 20B start moving might be delayed.

However, the restriction portion 35b permits the abutment of the drive pin 41b8 with the second edge 34b2 in the present embodiment. This prevents the timing when the trailing blades 20B start moving from being delayed.

Figure 8:
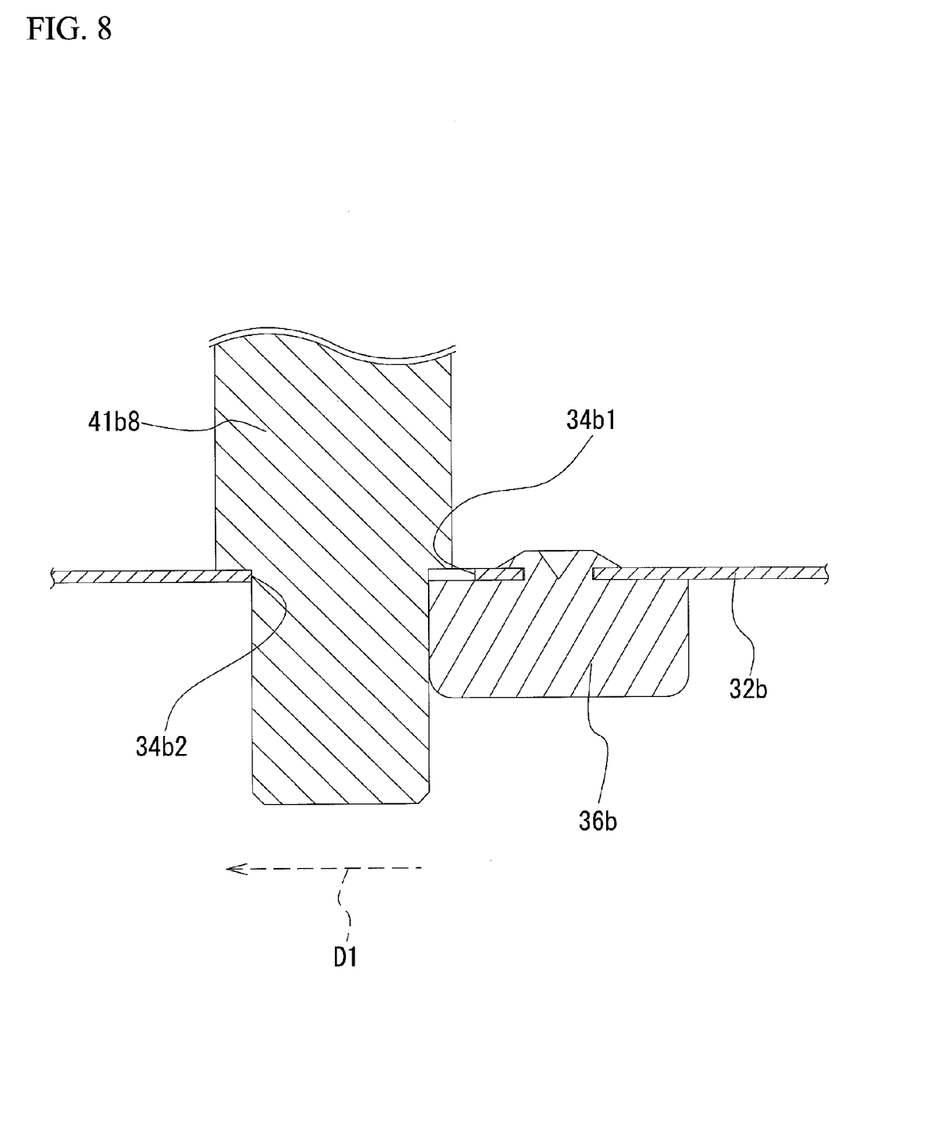
FIG. 8 is an explanatory view of a variation of the restriction portion.

Next, a variation of the restriction portion will be described. FIG. 8 is an explanatory view of the variation of the restriction portion. FIG. 8 corresponds to FIG. 7. A restriction portion 36b is made of a synthetic resin. The restriction portion 36b is secured to the drive arm 32b by caulking. Even if such a configuration is employed, the abutment of the first edge 34b1 with the drive pin 41b8 can be restricted. Additionally, the restriction portion 36b is thicker than drive arm 32b, as illustrated in FIG. 8. For this reason, the area of the abutment of the drive pin 41b8 with the restriction portion 36b is comparatively large. Thus, there is little possibility that the drive pin 41b8 or the restriction portion 36b is chipped due to the abutment of the drive pin 41b8 with the restriction portion 36b.

In addition, the restriction portion 36b may be integrally formed with the drive arm 32b.

While the exemplary embodiments of the present invention have been illustrated in detail, the present invention is not limited to the above-mentioned embodiments, and other embodiments, variations and modifications may be made without departing from the scope of the present invention.

The focal plane shutter according to the present embodiment can be employed in an optical device such as a still camera or a digital camera.

The restriction portion may be provided in the drive arm 31a connected to the leading blades-drive lever 40A.

Although the blade having a thin shape and made of a synthetic resin has been described in the present embodiment, the blade having the thin shape may be made of a metal. Also, the drive arm 32b may be made of a synthetic resin and the drive pin 41b8 may be made of a metal, and both may be made of synthetic resins.

Finally, several aspects of the present invention are summarized as follows.

According to an aspect of the present invention, there is provided a focal plane shutter including: a board including an opening; a blade movable between a position where the blade recedes from the opening and a position where the blade covers at least part of the opening; a drive arm connected to the blade, the drive arm including an engagement hole; a drive lever including a drive pin engaging the engagement hole; and a restriction portion provided in the drive arm, the restriction portion abutting the drive pin and being thicker than the drive arm, wherein the engagement hole includes a first edge positioned at a start side where the drive pin moves in a predetermined direction and a second edge positioned at a terminal side where the drive pin moves in the predetermined direction, and the restriction portion allows an abutment of the second edge with the drive pin, and abuts the drive pin to restrict an abutment of the first edge with the drive pin.

When the drive pin moves in a predetermined direction and stops, the first edge intends to abut the drive pin by an inertial force of the drive arm. For this reason, at least one of the drive arm and the drive pin is chipped, whereby dusts might be generated. However, the restriction portion provided in the drive arm restricts the abutment of the first edge with the drive pin. This can prevent dusts from generating.

According to another aspect of the present invention, there is provided an optical device including the above focal plane shutter.

What is claimed is:
1. A focal plane shutter comprising:
a board including an opening;

a blade movable between a position where the blade recedes from the opening and a position where the blade covers at least part of the opening;

a drive arm connected to the blade, the drive arm including an engagement hole;

a drive lever including a drive pin engaging the engagement hole; and a restriction portion provided in the drive arm, the restriction portion abutting the drive pin and being thicker than the drive arm, wherein the engagement hole includes a first edge positioned at a start side where the drive pin moves in a predetermined direction and a second edge positioned at a terminal side where the drive pin moves in the predetermined direction, and the restriction portion allows an abutment of the second edge with the drive pin, and abuts the drive pin to restrict an abutment of the first edge with the drive pin.

2. The focal plane shutter of claim 1, wherein:

the drive lever is movable in a first direction at a predetermined speed and is movable in a second direction opposite to the first direction at a speed slower than the predetermined speed; and the start side and the terminal side of a movable range of the drive pin are set for a case where the drive lever moves in the first direction.

3. The focal plane shutter of claim 1, wherein the restriction portion is elastically deformable.

4. The focal plane shutter of claim 1, wherein at least one of the drive pin and the drive arm is made of a synthetic resin.

5. An optical device comprising a focal plane shutter, the focal plane shutter including:

a board including an opening;

a blade movable between a position where the blade recedes from the opening and a position where the blade covers at least part of the opening;

a drive arm connected to the blade, the drive arm including an engagement hole;

a drive lever including a drive pin engaging the engagement hole; and a restriction portion provided in the drive arm, the restriction portion abutting the drive pin and being thicker than the drive arm, wherein the engagement hole includes a first edge positioned at a start side where the drive pin moves in a predetermined direction and a second edge positioned at a terminal side where the drive pin moves in the predetermined direction, and the restriction portion allows an abutment of the second edge with the drive pin, and abuts the drive pin to restrict an abutment of the first edge with the drive pin.

* * * * *